Jan. 24, 1939. H. W. ALDEN ET AL Re. 20,982

OIL BURNER

Original Filed June 19, 1931 2 Sheets-Sheet 1

INVENTORS:
Herbert W. Alden and
Milton H. Powers
by Carr, Klan & Gravely,
Their ATTORNEYS Jan. 24, 1939. H. W. ALDEN ET AL Re. 20,982

OIL BURNER

Original Filed June 19, 1931 2 Sheets-Sheet 2

INVENTORS:
Herbert W. Alden and
Milton A. Powers,
by Carr Carr & Gravely,
Their ATTORNEYS Reissued Jan. 24, 1939

Re. 20,982

UNITED STATES PATENT OFFICE 20,982

OIL BURNER

Herbert W. Alden and Milton A. Powers, Detroit, Mich., assignors, by mesne assignments, to Timken-Detroit Axle Company, a corporation of Ohio Original No. 1,882,694, dated October 18, 1932, Serial No. 545,436, June 19, 1931. Application for reissue March 16, 1934, Serial No. 716,008

24 Claims. (Cl. 158—77)

Our invention relates to oil burners of the type having a rotary head disposed centrally of a hearth and spraying oil to the outer periphery of the hearth where combustion takes place. The invention has for its principal objects to make all of the parts of such a device easily installable and removable and easily accessible for purposes of inspection and repair, to provide a better spray of fuel, to simplify the construction and lessen the cost thereof and to make the device small and compact. The invention consists in the oil burner and in the parts and combinations and arrangements of parts hereinafter described and claimed.

In the accompanying drawings.

Figure 1:
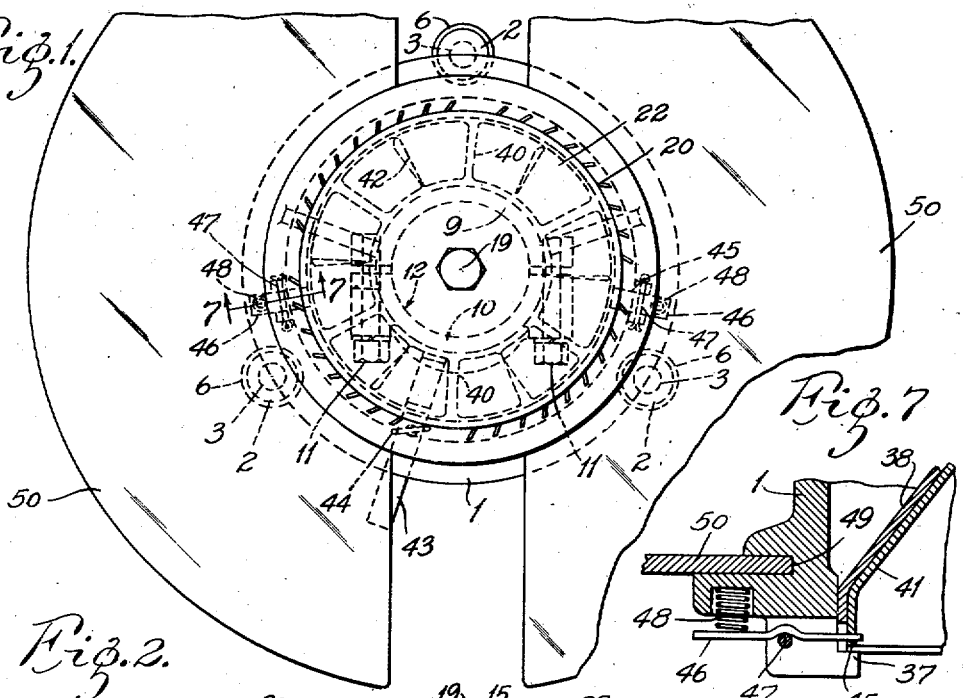
Figure 1 is a top plan view of an oil burner embodying our invention.
Figure 7:
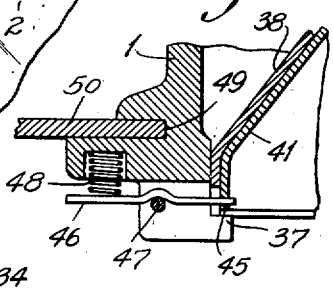
Figure 7 is a sectional view on the line 7—7 of Figure 1.
Figure 2:
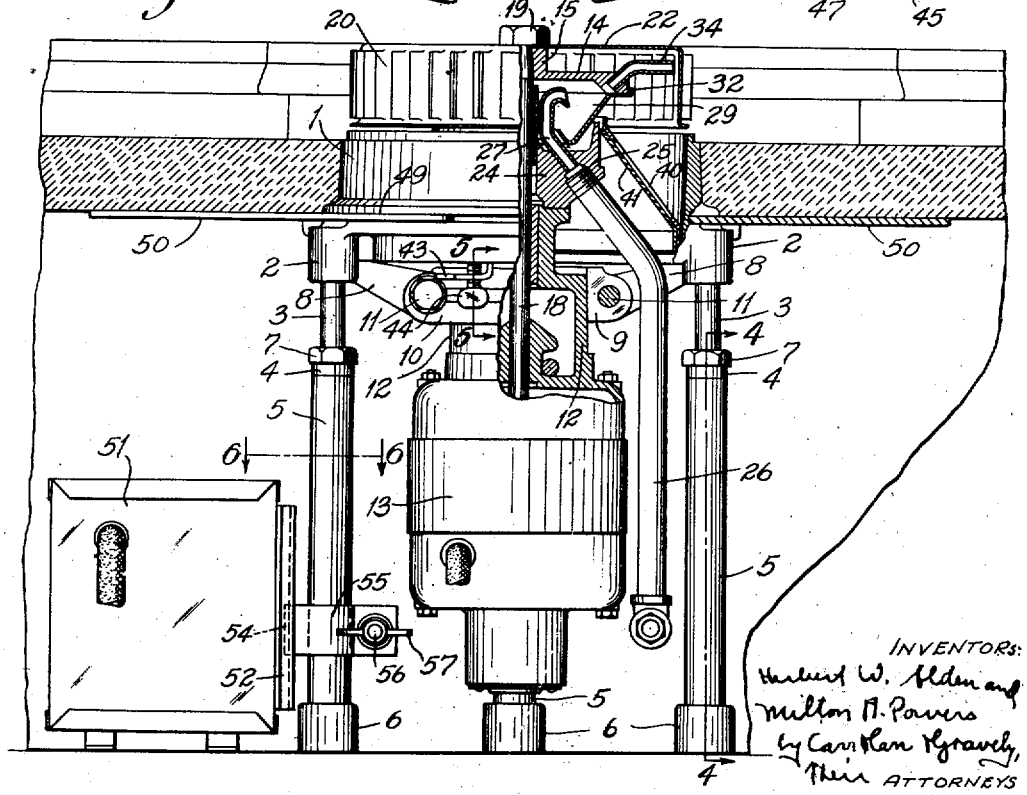
Figure 2 is a part elevation, part vertical sectional view thereof.
Figure 3:
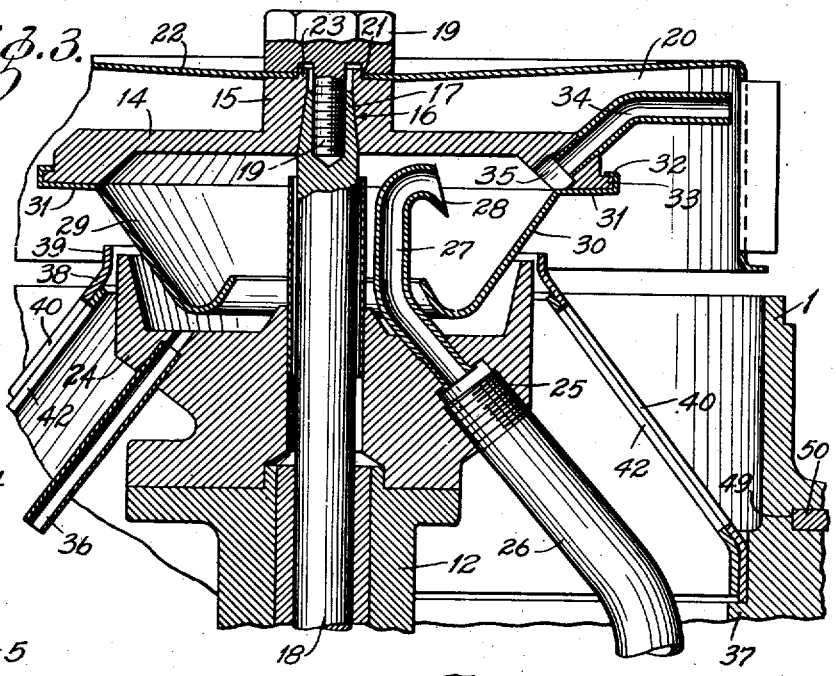
Figure 3 is a vertical sectional view of the upper portion of the burner.
Figure 4:
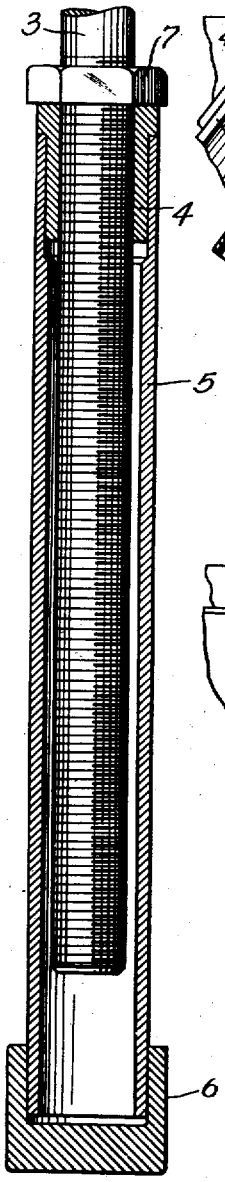
Figure 4 is a sectional view on the line 4—4 of Figure 2.
Figure 5:
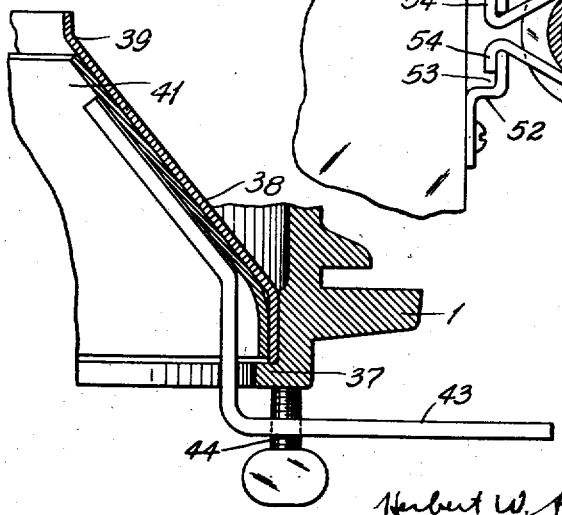
Figure 5 is a sectional view on the line 5—5 of Figure 2.
Figure 6:
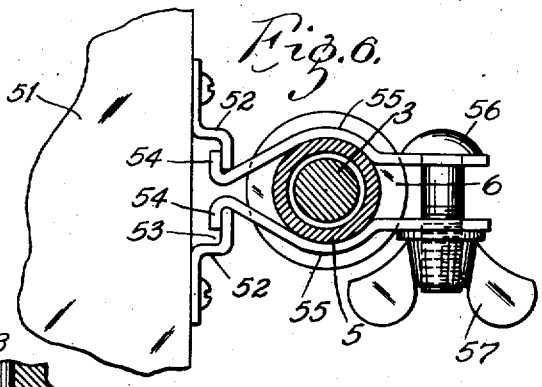
Figure 6 is a sectional view on the line 6—6 of Figure 2.

The main supporting frame of the burner construction comprises an annular wall member 1 provided with lugs 2 that receive threaded leg members 3 that extend into threaded sleeves 4 in the tops of supporting cylinders 5 provided with suitable base members 6. Mounted on each threaded leg 3 is a lock nut 7 that rests on top of a sleeve 4. By this arrangement, the frame 1 can be leveled and can be raised and lowered to desired position and locked in place.

Secured to inwardly projecting supporting arms 8 is a half ring 9 disposed centrally below the frame and with its axis vertical; and a cooperating half ring 10 is secured to said arms 8 by means of screws 11, said rings 9 and 10 constituting a circular clamping device in which is received a cylindrical projecting nosing 12 of an electric motor housing 13. The oil distributor head 14 has a central boss 15 that is provided with a conical bore 16 to fit the conical upper end 17 of the motor shaft 18, being secured by a screw 19 that is threaded into the end 17 of said shaft 18. A fan or blower member 20 has an axial hole 21 in its body or disk portion 22 to receive an annular rib 23 on said boss 15, the inner margin of said disk portion 22 resting on top of said boss 15, encircling said rib 23 and being held by said screw 19.

Mounted on top of said motor housing 13 is an annular head member 24 that is provided with an upwardly and inwardly inclined bore 25. An oil supply pipe 26 is threaded into the lower end of said bore 25 and a delivery tube 27 extends through said bore, projecting upwardly from the upper end of said head. The upper end of said tube is provided with an outwardly rebent tip 28 that overhangs a channel member 29 that is provided with an upwardly and outwardly sloping outer wall 30 terminating in a horizontal flange 31 whose outer edge portion 32 is rebent around a flange 33 at the periphery of said distributor head 14.

Extending diagonally upward and then substantially horizontally from said head 14 are oil distributor tubes 34 whose inner ends communicate with countersunk recesses 35 in the underside of said head 14. As the head 14 and channel member 29 rotate with the motor shaft 18, oil works its way upwardly along the wall 30 into said recesses 35 and said distributor pipes 34 and is flung outwardly by said pipes, fan blades being removed that would interfere with the spraying of oil. The motor head 24 is provided with a drain tube 36 for any oil that may overflow into the head from said channel member 29.

The frame member 1 is provided around the lower portion of its inner periphery with a ledge 37 on which rests the lower edge portion of a conical shell member 38 whose upper end has a projecting cylindrical portion 39 arranged in close proximity to the upper edge of the motor head member 24. Said shell is provided with openings 40 permitting passage of air. Disposed in said conical shell member 38 is a cooperating conical shell member 41 with openings 42 corresponding to those 40 of the outer member 38. Said inner conical member 41 is provided with an operating handle 43 so that it may be turned to bring the openings 40 and 42 into alinement with each other, wholly or in part, thereby regulating the air admitted to the furnace. A locking screw 44 is mounted in said handle 43 bearing against said frame 1. Said inner conical member 41 is provided with recessed portions 45 around its lower periphery. Into each recess 45 extends a lever 46 that is mounted on a pin 47 in the frame 1 and the top of whose outer end portion is engaged by a spring 48 mounted in said frame 1. The pressure of said springs 48 forces the inner ends of said levers 46 upwardly against the inner conical member 41, thus holding it firmly in engagement with the outer member 38 with its lower edge spaced slightly above said ledge 37.

The frame member 1 is provided with an annular groove 49 in which are received the edges of hearth supporting plates 50, the refractory hearth tile or brick being supported on said plates. Thus a hearth support of large area and ample strength is provided and may be installed with a minimum of effort. The frame member itself may be easily installed in the furnace, mounted at the correct height and adjusted to horizontal position.

Disposed adjacent to the burner is a transformer 51 for the electric ignition circuit. Said transformer 51 is provided with Z-shaped strips 52 providing a vertically extending slot 53 in which are received the hooked ends 54 of clamp members 55 that extend around one of said leg cylinders 5 and are secured by a bolt 56 and wing nut 57.

With the frame horizontal, the motor is easily mounted in the clamp member and may readily be adjusted for any desired height. The frame being horizontal, it is impossible for the motor to be clamped in any but the necessary vertical position. As it is frequently necessary to make adjustments of the oil and air discharge levels for proper combustion after the installation is completed, the importance of avoiding a releveling procedure each time a vertical adjustment is made is readily apparent. Heretofore it has been necessary to go through a laborious procedure of cut and try adjustment of screws and locknuts until a bubble level indicated a proper horizontal discharge level for the oil. As leveling was necessary in all directions around the full circumference of the hearth circle the process was further complicated. As readjustment is usually done while the boiler is hot it was very inconvenient to place and read the leveling device in its position upon the burner head within the combustion chamber. With our arrangement after the initial leveling of the frame at the time of installation, it is impossible to set the burner in any but a vertical position—without any effort on the part of the adjuster, and because of the construction of the clamping device, with a minimum total expenditure of effort.

With the motor in position it is a very simple matter to place the cap and channel member in place upon the conical end of the motor shaft, position the fan upon the boss and secure all together by drawing down with the screw on the top of the shaft. The importance of this construction in conjunction with the clamping means is understood when it is realized with what expediency the vital parts may be removed and replaced in service. In actual practice it is possible to replace a burner motor and have the installation again in operation in less than five minutes time. Fans and oil distributor heads usually require less than one minute for replacement.

The adjustment of the air shutter is readily accomplished by moving the projecting handle member. The shutter remains fixed in any position it may be left, but a locking screw is provided to prevent accidental movement or tampering. The inner edge of the air shutter is close enough to the head member so there is no substantial passage of air through the slit space therebetween. Thus the amount of air is easily controlled, rattling of the parts is prevented and the shutter may be held securely in the desired position.

Obviously numerous changes may be made without departing from the invention and we do not wish to be limited to the precise construction shown.

What we claim is:

1. In an oil burner having a motor and draft control member, a supporting frame therefor comprising an annular wall member and a motor supporting clamp suspended therefrom, said wall member having an annular ledge around the lower portion of its inner periphery for supporting the draft control member.

2. In an oil burner having a motor, a draft control member and a hearth supporting plate, a supporting frame therefor comprising an annular wall member and a motor supporting clamp suspended therefrom, said wall member having an annular ledge around the lower portion of its inner periphery for supporting the draft control member and also having an annular groove around the lower portion of its outer periphery for receiving the edge of the hearth supporting plate.

3. In an oil burner having a motor and hearth carrying members, a supporting frame therefor comprising an annular wall member, motor supporting means attached thereto, said wall member having an annular groove around the lower portion of its outer periphery for supporting the hearth carrying members.

4. An oil burner comprising an annular wall having an outwardly projecting flange around its lower edge, threaded legs having their upper ends mounted in said flange, a sleeve for each leg, inwardly and downwardly inclined arms at the bottom of said wall, a semicircular clamp secured at the ends of said arms with its axis vertical, a semicircular clamp for cooperating therewith and a motor having a cylindrical nosing disposed in said clamp members.

5. An oil burner comprising an annular wall, adjustable supporting legs therefor, a clamp member suspended from said wall member with its axis vertical, and a motor driven burner assembly adjustably supported by said clamp member for distributing oil and air for combustion.

6. An oil burner comprising an annular wall member, supporting legs therefor, a clamp suspended from said wall member with its axis vertical, a motor supported in said clamp, a head at the top of the housing of said motor having a cylindrical upper end portion, said wall member having a generally conical member to control the flow of air to the burner having its lower end supported by the wall member and having a cylindrical upper end portion closely encircling the upper end of said head.

7. An oil burner comprising an annular wall member, supporting legs therefor, a clamp suspended from said wall member with its axis vertical, a motor supported in said clamp, a head at the top of the housing of said motor having a cylindrical upper end portion, a generally conical perforated air-control member having its lower end supported by said wall member and having a cylindrical upper end portion closely encircling the upper end of said head, a cooperating conical perforated air-control member nested in said first air-control member, levers pivotally mounted in said wall member with their inner ends disposed in notches provided therefor in the lower edge of said inner air-control member and springs bearing on the outer ends of said levers for holding said inner air-control member firmly in place.

8. An oil burner comprising an annular wall, adjustable supporting legs therefor, a clamp member suspended from said wall member with its axis vertical, an electric motor having a projecting nosing held in said clamp member, the shaft of said motor projecting upwardly and having a conical upper end portion, a distributor head having a conical bore fitting on the upper end of said motor shaft, said head having a boss, a fan body resting on said boss, and a screw threaded into said shaft end and holding said head and fan in assembly on said motor shaft.

9. An oil burner comprising an annular wall, adjustable supporting legs therefor, a clamp member suspended from said wall member with its axis vertical, an electric motor having a projecting nosing held in said clamp member, the shaft of said motor projecting upwardly and having a conical upper end portion, a distributor head having a conical bore fitting on the upper end of said motor shaft, said head having a boss, a fan body resting on said boss, a screw threaded into said shaft end and holding said plate and fan in assembly on said motor shaft and means feeding oil to said distributor head.

10. In an oil burner having a motor and hearth carrying members, a supporting frame therefor comprising an annular wall member, motor supporting means attached thereto, said wall member having an annular groove around its outer periphery for supporting the hearth carrying members.

11. An oil burner comprising an annular wall, adjustable supporting legs therefor, an annular supporting member suspended from said wall member with its axis vertical, and a motor driven burner assembly adjustably supported by said supporting member for distributing oil and air for combustion.

12. An oil burner comprising an annular wall, a fan having a disk-like body provided with an annular skirt depending from its periphery, said skirt having a multiplicity of blades projecting outwardly therefrom, said fan being supported for rotation above and in closely spaced relation to said annular wall, a distributor head having radially extending pipes disposed within said fan and terminating relatively close to said skirt, and openings in said skirt opposite said pipes, said openings being spaced from said blades so that oil may be discharged without interference from said blades.

13. An oil burner comprising an annular wall, a rotary distributor head disposed substantially entirely about said annular wall, a fan carried by said distributor head and having a disk-like body provided with an annular skirt depending from its periphery, said skirt having a multiplicity of blades projecting outwardly therefrom, said fan being formed to house said distributor head, distributor pipes extending from said head toward and terminating just short of said peripheral wall, and openings in said last named wall between said blades to permit discharge of oil through said wall without interference of said blades.

14. The oil burner defined in claim 13 including adjustable conical means for controlling the supply of air to the burner secured to the lower edge of said annular wall and terminating adjacent said distributor head approximately in the plane of the top edge of said annular wall.

15. An oil burner including a rotatably mounted centrifugal distributor comprising a head having distributor pipes extending radially therefrom, a fan including a disk-like body and an annular skirt depending from its periphery housing said head and said pipes and having openings in said skirt opposite the pipes, and blades extending outwardly from the peripheral wall of said fan except opposite said pipes.

16. An oil burner including a rotatably mounted centrifugal distributor comprising a head having a channel member and distributor pipes extending radially outward from said channel member, a fan including a disk-like body and an annular skirt depending from its periphery housing said head and said pipes, said skirt extending downwardly past said pipes and to a point approximately opposite the bottom of said channel member, said skirt having openings opposite said pipes, and a multiplicity of fan blades projecting from said skirt at spaced intervals except at said openings.

17. The combination defined in claim 16 in which said channel member is formed of sheet metal and is secured to said head by bending a part thereof around a part of said head.

18. An oil burner including a centrifugal distributing head rotatably mounted with respect to a furnace, said head including radial oil distributing pipes, a fan element fixed to said head having blades all of which are disposed to move in a path radially outside the delivery ends of said pipes, said blades extending above and below said ends, said element being free of blades opposite said ends so that said element does not interfere with the spraying of oil from said distributing head.

19. An oil burner comprising an annular wall member, a centrifugal distributor rotatably secured to said member and including a head and fan element in the form of a peripheral wall surrounding the head, said peripheral wall extending close to said annular wall member, and adjustable elements to control the flow of air to said burner disposed between the lower edge of said annular wall member and said head, said elements extending inwardly and upwardly from the wall member to said head.

20. The combination defined in claim 19 in which said last named elements consist of two nested conical shells secured to said wall member and having openings formed in each shell.

21. An oil burner comprising an annular wall member, a centrifugal distributor rotatably secured to said member and including a head and oil discharge pipes, and a fan element housing said head and pipes and extending close to said annular wall member, adjustable means between said wall member and head to control the flow of air to the burner, and openings in said element opposite said pipes to permit discharge of oil from said head independently of the action of said fan element.

22. In an oil burner, a motor driven rotatable head having fuel distributor tubes, and a fan surmounting the head and having a turned peripheral edge portion carrying a plurality of fan blades, said peripheral edge portion having a plurality of openings extending therethrough at points adjacent said fan blades, the discharge ends of said fuel distributor tubes terminating adjacent an opening in said peripheral edge portion for discharging a stream of fuel through said opening substantially free from blade impact.

23. In an oil burner, a motor driven rotatable head having fuel distributor tubes, and a fan surmounting the head and having a turned peripheral edge portion carrying a plurality of fan blades, said peripheral edge portion having a plurality of openings extending therethrough at points adjacent said fan blades, the discharge ends of said fuel distributor tubes terminating adjacent openings in said peripheral edge portion between a pair of said blades spaced circumferentially a greater distance than an adjacent pair of blades for discharging streams of fuel through said openings substantially free from blade impact.

24. An oil burner including a rotatably mounted centrifugal distributor, comprising a head, a member having a disk-like body and an annular skirt depending from its periphery housing said head, fan blades carried by said member, and means to discharge oil from said head through said member at widely spaced points between said blades without interference from said blades, said head including a channel member disposed substantially entirely within said first-named member.

HERBERT W. ALDEN.
MILTON A. POWERS.